United States Patent [19]
Ehrenpreis

[11] Patent Number: 6,004,136
[45] Date of Patent: Dec. 21, 1999

[54] TOY FOR EDUCATING ABOUT MEDICAL TREATMENTS

[76] Inventor: Barbara Ehrenpreis, 5 Marian Ln., Jericho, N.Y. 11753

[21] Appl. No.: 09/080,427

[22] Filed: May 18, 1998

[51] Int. Cl.[6] .............................. G09B 23/28; A63H 3/00
[52] U.S. Cl. ............................................. 434/262; 446/295
[58] Field of Search .................................. 434/262, 267, 434/247, 256, 268, 272; 446/268, 295, 296, 304, 472

[56] References Cited

U.S. PATENT DOCUMENTS

| | | | |
|---|---|---|---|
| D. 347,655 | 6/1994 | Munro | D19/62 |
| 4,182,054 | 1/1980 | Wise et al. | 434/272 |
| 4,257,188 | 3/1981 | Barker | 446/295 |
| 4,575,351 | 3/1986 | Gonzalez | 446/371 |
| 5,257,514 | 11/1993 | Okuno | 66/64 |
| 5,312,287 | 5/1994 | Chuang | 446/295 |
| 5,314,339 | 5/1994 | Aponte | 434/267 |
| 5,795,213 | 8/1998 | Goodwin | 446/297 |
| 5,842,870 | 12/1998 | Cramer | 434/267 |

FOREIGN PATENT DOCUMENTS 3-75656  12/1991  Japan .

*Primary Examiner*—Gene Mancene
*Assistant Examiner*—Michael B. Priddy
*Attorney, Agent, or Firm*—R. Neil Sudol; Henry D. Coleman

[57] ABSTRACT

An educational toy in the form of a doll provided with one or more hidden connectors for removably attaching respective replicas of medical treatment devices to the doll. The doll and the medical treatment device replicas are parts of a kit also including an instructional booklet.

16 Claims, 2 Drawing Sheets

TOY FOR EDUCATING ABOUT MEDICAL TREATMENTS

BACKGROUND OF THE INVENTION

This invention pertains to a toy. More particularly, this invention relates to a toy for educating users, such as children, about certain kinds of medical treatment. This invention also relates to an associated kit.

Many people are afflicted with an ailment or disease which requires periodic or continual treatment, even though the persons are ambulatory and otherwise capable of carrying out normal daily activities. Such periodic or continual treatment is frequently implemented through the use of a medical device such as an access tube which traverses the patient's skin. Thus, one end portion of the access tube is disposed inside the patient, while an opposite end portion of the tube is disposed outside the patient. Such access tubes include peripheral intravenous tubes, central line access catheters, enteral nutrition tubes, total parenteral nutrition tubes, naso-gastric feeding tubes, tracheostomy attachments, gastrostomy feeding tubes, and jejunostomy feeding tubes.

A child, particularly a young child, can become confused and conflicted when the child or a person close to him or her is provided with an attached medical treatment device such as the above-mentioned access tubes. The child needs to be reassured that the individual who has the attached medical treatment device is still the same person, but with a temporary or permanent attachment. It would be beneficial to have a toy for assisting the child's understanding and convincing the child that the treated individual is still the same person and not all that different from before the treatment device was attached. Also, the child should be educated as to the operation, use, and purpose of the treatment device.

OBJECTS OF THE INVENTION

An object of the present invention is to provide an educational toy.

It is a more particular object of the present invention to provide an educational toy which instructs a child as to a medical treatment device which is attached to a person.

An even more particular object of the present invention is to provide such a toy which is utilizable to instruct as to a plurality of different medical conditions.

It is a further object of the present invention to provide such a toy which is easy to use.

Yet another object of the present invention is to provide such a toy which is inexpensive and can be manufactured largely from existing components.

These and other objects of the present invention will be apparent from the drawings and descriptions herein.

SUMMARY OF THE INVENTION

An educational toy comprises, in accordance with the present invention, a doll, a replica of a medical treatment device, a first connector on the doll, and a second connector on the replica. The second connector is removably coupled to the first connector to releasably attach the medical device replica to the doll, thereby simulating application of a medical treatment to the doll.

Preferably, the first connector is disposed on the doll so as to be hidden from view upon a detachment of the second connector from the first connector and a concomitant removal of the medical device replica from the doll. Thus, the doll can simulate a healthy individual who is not subject to any medical treatment. The hiding of the connector on the doll is achievable where the doll is a teddy bear having a matt of fibers simulating fur by disposing that connector among the fibers of the teddy bear's "fur."

The doll may resemble a life form, particularly a vertebrate animal such as a bear (teddy bear), a dinosaur (extinct life form), a human being, a cat, etc. Where the doll resembles a life form, the first connector is disposed beneath a covering simulating a natural outer surface of the life form. That outer surface exemplarily takes the form of simulated fur, simulated skin or toy clothing.

It is contemplated that the doll has more than one hidden connector each for removably attaching a medical device replica of a respective medical treatment device. For example, a toy bear may be provided with a connector on the arm for the removable attachment of a toy peripheral intravenous tube, a connector on the chest for the removable coupling of a toy central line access catheter, a connector in the abdominal area for the releasable coupling of a toy enteral nutrition tube, a connector on the upper chest for the disengageable attachment of a toy total parenteral nutrition tube, a connector in the nose for the detachable linkage of a toy naso-gastric feeding tube, a connector on the throat for the reversible tying of a toy tracheostomy attachment, and/or a connector on the stomach for the terminable connection of a toy gastrostomy feeding tube. In addition, connectors may be provided on various appendages and other locations on the dolls for the removable attachment of toy bandages, adjustable splints and casts.

In some cases, one connector on the doll may be used for alternately connecting different toy medical devices to the doll. For example, a connector on the arm may be used for the removable attachment of a toy peripheral intravenous tube and alternatively for the removable attachment of a toy bandage, adjustable splint or cast.

The connectors may be male and female connectors, for example, ball-and-socket snap fasteners, or VELCRO™-type hook-and-loop fasteners. Other kinds of connectors are certainly within the existing skill in the art. For example, adhesive layers or pin-cushions.

The present invention contemplates a kit for educating a user about medical treatments. The kit includes the above-described doll provided with one or more first connectors and further includes one or more replicas of respective medical treatment devices, these replicas being provided with respective second connectors. These second connectors are removably coupled to respective first connectors to releasably attach the medical device replicas to the doll, thereby simulating application of one or more medical treatments to the doll. The kit additionally includes a booklet with illustrations and explanations pertaining to operation, use and purpose of the medical treatment device or devices.

The booklet is designed to be suitable as a heuristic device for youngsters. For example, some of the illustrations may be in outline form suitable for coloring by crayons or other tinting method. In addition, the explanations are directed to youthful interests. For instance, stories are especially useful as an instructional approach.

Of course, the booklet may be designed to appeal more to adult users. In that case, the booklet has illustrations and explanations more suitable to an adult's interests and capabilities.

The kit preferably includes a container for holding the replicas of medical treatment devices.

The present invention provides an educational toy which instructs a child (or adult) as to a medical treatment device which is attached to a person. The toy is especially effective in gently educating a child (or adult) as to the fact that many people under medical treatment are indeed normal in many respects, capable of performing many day to day tasks and looking generally "normal." This healthy aspect of modern medical treatments is emphasized by having the doll dressed in contemporary clothing. The doll has the external appearance of a conventional toy. The medical condition is revealed only on close inspection and use of the doll or kit in accordance with the invention. This allows the toy to be used as an educational tool to demonstrate to a child (or adult) a medical condition of a person in the child's (or adult's)'s life, whether the child himself, a relative or friend.

A toy in accordance with the present invention is utilizable to instruct as to many different medical conditions. The toy is easy to make and can be constructed with off-the-shelf i.e., pre-existing, components. For example, catheters and other medical treatment devices exist for the treatment of children. These devices are smaller than their adult counterparts and can be easily integrated into an instructional kit in accordance with the present invention. In addition, the toy and kit of the present invention are inexpensive and easy to use.

DESCRIPTION OF THE PREFERRED EMBODIMENTS

Figure 1:
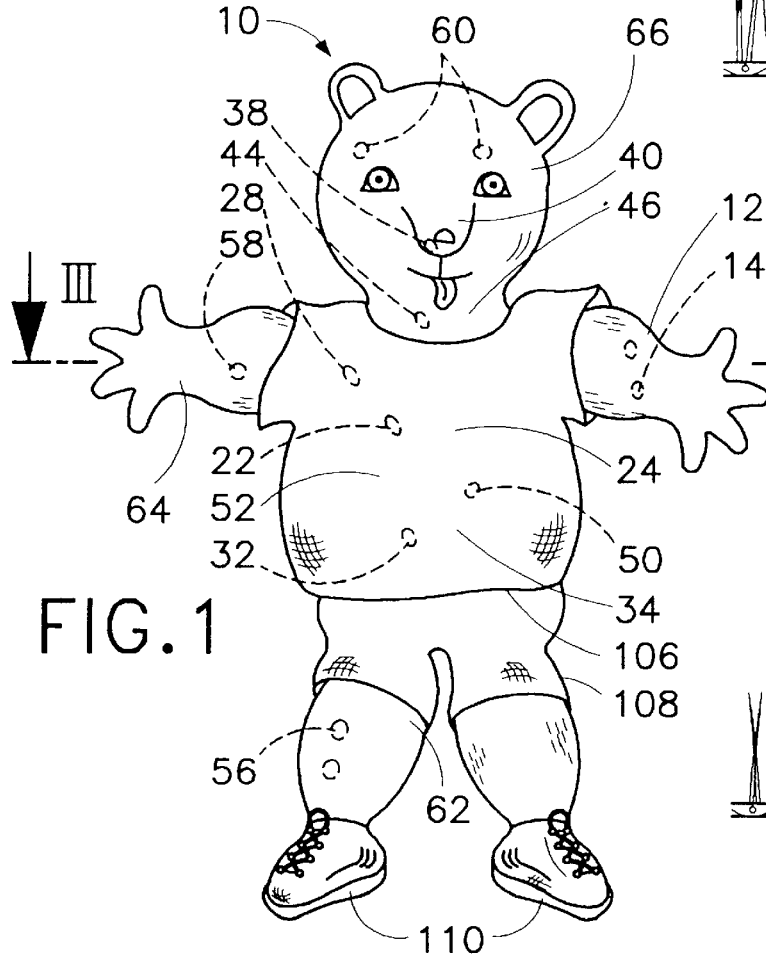
FIG. 1 is a schematic front elevational view of a doll in accordance with the present invention, showing hidden connectors for the removable attachment of replicas of medical treatment devices.
Figure 3:
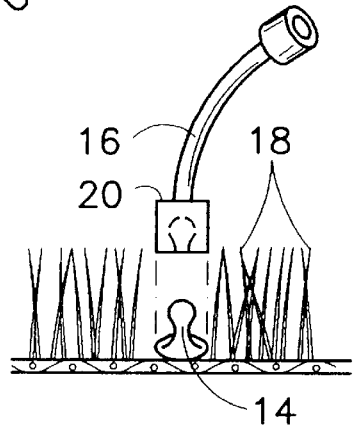
FIG. 3 is a schematic partial cross-sectional view taken along line III—III in FIG. 1, showing a hidden connector for the removable attachment of a simulated medical treatment device.

FIG. 1 illustrates a doll in the form of a teddy bear or toy bear 10 for educating a child (or adult) as to medical treatment devices and procedures. Toy bear 10 is provided with an arm 12 with a first connector 14 for releasably attaching a replica 16 of a peripheral intravenous tube (FIG. 2) to the bear's arm. As illustrated in FIG. 3, connector 14 specifically takes the form of a ball which is hidden among simulated fur fibers 18 of toy bear 10. Ball 14 is removably received in a socket-type connector 20 of intravenous tube replica 16. Upon attachment of replica 16 to teddy bear arm 12 via connectors 14 and 20, as illustrated in FIG. 2, a peripheral intravenous access is simulated.

Figure 2:
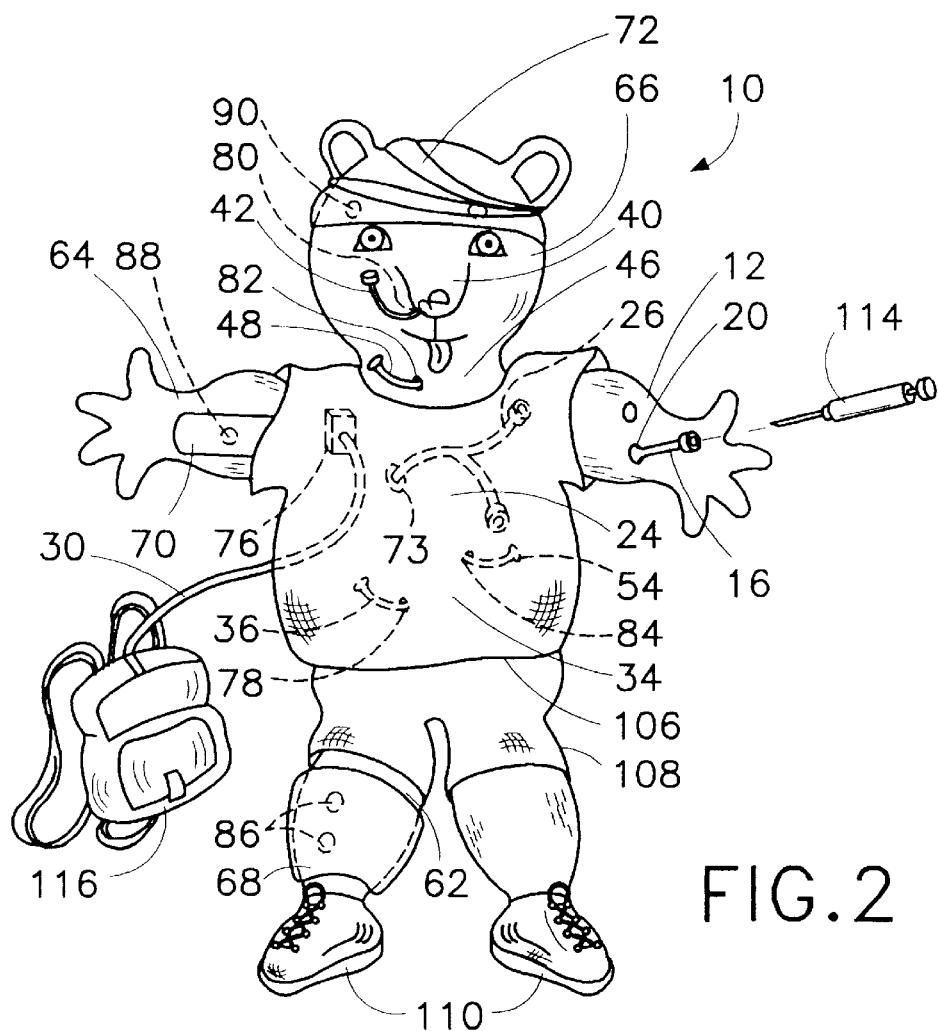
FIG. 2 is a schematic front elevational view of the doll of FIG. 1, showing attached replicas of medical treatment devices.

Toy bear 10 is provided with a plurality of additional hidden connectors shown in FIG. 1 for removably connecting respective replicas of medical treatment devices shown in FIG. 2. Specifically, toy bear 10 is provided with a connector 22 (FIG. 1) on an upper chest 24 for the removable coupling of a toy central line access catheter 26 (FIG. 2), another connector 28 on upper chest 24 for the disengageable attachment of a toy total parenteral nutrition tube 30, a further connector 32 in an abdominal area 34 for the releasable coupling of a toy enteral nutrition tube 36, an additional connector 38 in a nostril or nose 40 of the toy bear 10 for the detachable linkage of a toy naso-gastric feeding tube 42, a supplemental connector 44 in a throat area 46 for the reversible tying of a toy tracheostomy attachment 48, and yet another connector 50 on the stomach 52 for the terminable connection of a toy gastrostomy feeding tube 54. Additional hidden connectors 56, 58, and 60 are provided on a leg 62, an arm 64, and the head 66 of the toy bear 10 for purposes of removably attaching a replica cast 68, a replica splint 70 and a replica head bandage 72, respectively.

Figure 4:
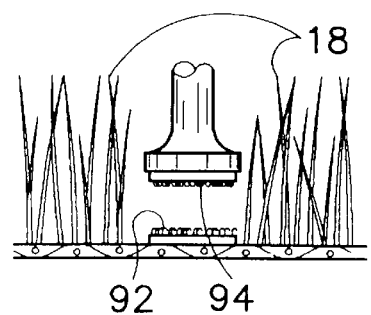
FIG. 4 is a schematic partial cross-sectional view similar to FIG. 3, showing another type of connector for the removable attachment of a simulated medical treatment device.

Each toy medical treatment device replica 16, 26, 30, 36, 42, 48, 54, 68, 70, and 72 is provided with a connector 20, 73, 76, 78, 80, 82, 84 86, 88, and 90 for releasably coupling to the respective connector 14, 22, 28, 32, 38, 44, 50, 56, 58, and 60 on toy bear 10. The connectors 20, 73, 76, 78, 80, 82, 84, 86, 88, and 90 on the toy medical treatment replicas 16, 26, 30, 36, 42, 48, 54, 68, 70, and 72 may take the form of sockets or female connectors, while the connectors 14, 22, 28, 32, 38, 44, 50, 56, 58, and 60 on toy bear 10 take the form of balls or male connectors. Other kinds of releasable connectors include VELCRO™-type hook and loop fasteners 92 and 94 (FIG. 4) and adhesive layers (not illustrated).

Figures 5, 8:
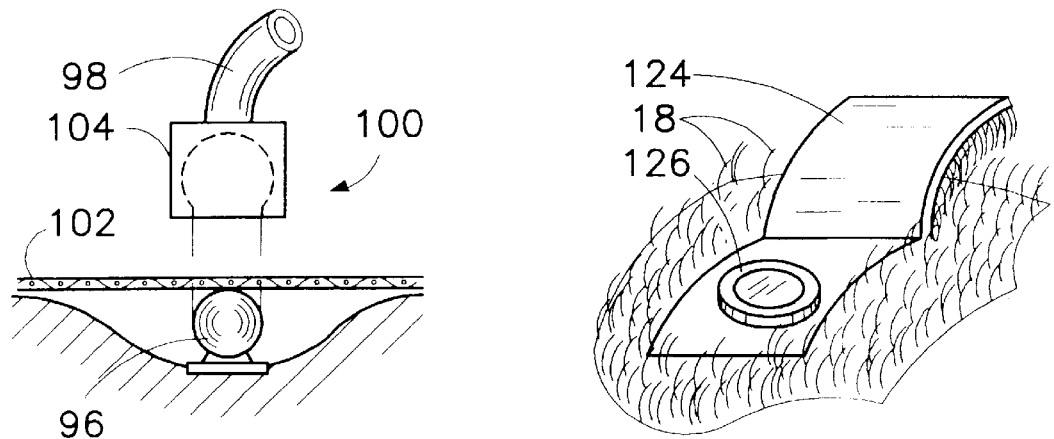
FIG. 5 is a schematic partial cross-sectional view similar to FIG. 3, showing another arrangement of the connector of FIG. 3 for the removable attachment of a simulated medical treatment device to a doll.
FIG. 8 is a schematic partial perspective view of a portion of surface of the doll of FIG. 1 showing a replica of a medical treatment device below the surface.

As shown in FIG. 5, a fastener or connector 96 for detachably coupling a toy medical treatment device replica 98 to a doll 100 may be disposed beneath a fabric or polymeric web 102 which simulates a skin surface of the doll. Fastener or connector 96 cooperates with a fastener or connector 104 on replica 98, incidentally clamping a portion of fabric or polymeric web 102.

All of the connectors 14, 22, 28, 32, 38, 44, 50, 56, 58, and 60 (and 94, 96) on toy bear 10 are normally hidden from view. As described above, all of these connectors are disposed among simulated fur fibers 18 which hide the connectors from visual observation during a casual inspection. Connectors 22, 28, 32, and 50, for the removable attachment of toy central line access catheter 26, toy total parenteral nutrition tube 30, toy enteral nutrition tube 36, and toy gastrostomy feeding tube 54, are additionally or alternatively hidden by an article of clothing 106 such as a shirt. In general, toy bear 10 is clothed according to contemporary conventions, for example, by a pair of shorts 108 and sneakers 110.

Because toy bear 10 is dressed in contemporary clothing and has the external appearance of a conventional toy, a youngster is gently educated to the fact that many people under medical treatment are indeed normal in many respects, and capable of performing many day to day tasks. The medical condition is revealed only on close inspection and use of the doll or kit in accordance with the invention. This allows the toy to be used as an educational tool to demonstrate to a child (or adult) a medical condition of a person in the child's (adult's) life, whether the child himself, a relative or friend.

It is to be noted that many of the connectors 14, 22, 28, 32, 38, 44, 50, 56, 58, and 60 (and 94, 96) on toy bear 10 may be used for multiple purposes, alternately. Thus, connector 14 on arm 12 may function to releasably bind a bandage, splint or cast (not shown on arm 12) to that arm.

Figure 6:
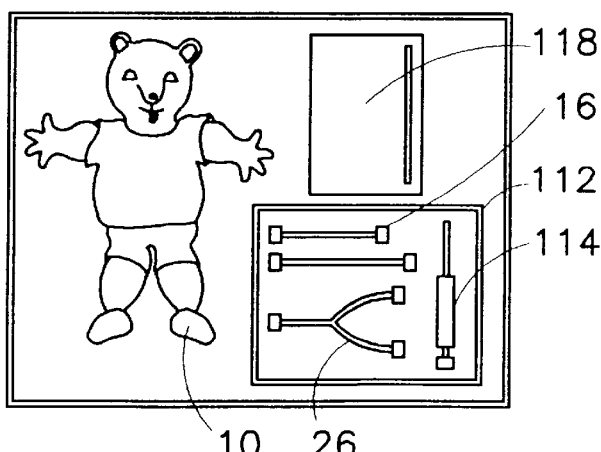
FIG. 6 is a top plan view of a toy kit including the doll of FIG. 1, a container of replicas of medical treatment devices for attachment to the doll, and an instructional booklet.

Toy bear 10 and toy medical treatment device replicas 16, 26, 30, 36, 42, 48, 54, 68, 70, and 72 are parts of a kit shown in FIG. 6. Replicas 16, 26, 30, 36, 42, 48, 54, 68, 70, and 72 (not all shown in FIG. 6) are held in a container 112 which may also store ancillary toys such as a replica of a hypodermic syringe 114. As indicated in FIG. 2, syringe 114 may be used to simulate intravenous access through replica 16 of a peripheral intravenous tube. Other accessories may include a toy backpack 116 (FIG. 2) for carrying a replica of a total parenteral nutrition bag (not shown) connected to tube 30 or enteral feeding bag (not shown).

Figure 7:
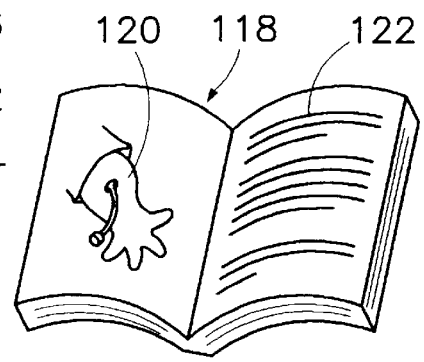
FIG. 7 is a view of the booklet of FIG. 6, showing a page of the booklet with a coloring illustration.

The kit of FIG. 6 also includes an instructional booklet 118 which contains illustrations 120 (see FIG. 7) and written explanations 122, for example, stories, suitable for young children.

As illustrated in FIG. 8, toy bear 10 may be provided with a flap, hatch or hinged door 124 which may be turned aside as shown to reveal an implanted medical device 124 such as a subcutaneous central access device.

Although the invention has been described in terms of particular embodiments and applications, one of ordinary skill in the art, in light of this teaching, can generate additional embodiments and modifications without departing from the spirit of or exceeding the scope of the claimed invention. For example, it is to be noted that other kinds of medical treatment devices may be simulated for releasably coupling to a doll as described herein. Different kinds of devices may be replicated for implantation beneath the skin or other surface of a toy figure.

Accordingly, it is to be understood that the drawings and descriptions herein are offered by way of example to facilitate comprehension of the invention and should not be construed to limit the scope thereof.

What is claimed is:

1. An educational toy comprising:
    a doll resembling a life form, said doll having a covering simulating a natural outer surface of said life form;
    a replica of a medical treatment device;
    a first connector on said doll, said first connector being disposed beneath said covering to hide said first connector from view and to thereby provide said doll with a normal aspect; and
    a second connector on said replica, said second connector being removably coupled to said first connector through said covering to releasably attach said replica to said doll, thereby simulating application of a medical treatment to said doll.

2. The toy defined in claim 1, further comprising:
    an additional replica of an additional medical treatment device;
    a first additional connector on said doll; and
    a second additional connector on said additional replica, said second additional connector being removably couplable to said first additional connector to releasably attach said additional replica to said doll, thereby simulating application of another medical treatment to said doll.

3. The toy defined in claim 2 wherein each of the medical treatment devices is taken from the group consisting essentially of peripheral intravenous tubes, central line access catheters, enteral nutrition tubes, total parenteral nutrition tubes, naso-gastric feeding tubes, tracheostomy attachments, gastrostomy feeding tubes, jejunostomy feeding tubes, bandages, adjustable splints and casts.

4. The toy defined in claim 1 wherein said replica is one of a plurality of replicas of medical treatment devices, each of said replicas having a respective second connector removably couplable to said first connector, so that said replicas are alternately attachable to said doll via said first connector.

5. The toy defined in claim 1 wherein said first connector and said second connector are taken from the group consisting essentially of male and female connectors, snap fasteners, and hook-and-loop type fasteners.

6. The toy defined in claim 1 wherein said medical treatment device is taken from the group consisting essentially of peripheral intravenous tubes, central line access catheters, enteral nutrition tubes, total parenteral nutrition tubes, naso-gastric feeding tubes, tracheostomy attachments, gastrostomy feeding tubes, jejunostomy feeding tubes, bandages, adjustable splints and casts.

7. The toy defined in claim 1, further comprising an additional replica of an additional medical treatment device disposed beneath said covering, said covering having an access flap for enabling a user to view said additional medical treatment device.

8. The toy defined in claim 1 wherein said covering simulates a skin surface of said life form.

9. A kit for educating a user about medical treatments, comprising:
    a doll resembling a life form, said doll having a covering simulating a natural outer surface of said life form, said doll being provided with a first connector disposed beneath said covering to hide said first connector from view and to thereby provide said doll with a normal aspect;
    a replica of a medical treatment device, said replica being provided with a second connector so that the second connector is removably coupled to said first connector through said covering to releasably attach said replica to said doll, thereby simulating application of a medical treatment to said doll; and
    a booklet with illustrations and explanations pertaining to operation, use and purpose of said medical treatment device.

10. The kit defined in claim 9 wherein said doll is provided with a third connector disposed in a location on said doll spaced from said first connector, said replica being a first replica, further comprising a second replica of a medical treatment device, said second replica having a fourth connector removably couplable to said third connector to releasably attach said second replica to said doll, thereby simulating application of another medical treatment to said doll.

11. The kit defined in claim 10 wherein each of the medical treatment devices is taken from the group consisting essentially of peripheral intravenous tubes, central line access catheters, enteral nutrition tubes, total parenteral nutrition tubes, naso-gastric feeding tubes, tracheostomy attachments, gastrostomy feeding tubes, jejunostomy feeding tubes, bandages, adjustable splints and casts.

12. The kit defined in claim 9, further comprising a container for the replicas.

13. The kit defined in claim 9 wherein at least one of said illustrations is a line drawing suitable for coloring in by the user, 14. The kit defined in claim 9 wherein said medical treatment device is taken from the group consisting essentially of peripheral intravenous tubes, central line access catheters, enteral nutrition tubes, total parenteral nutrition tubes, naso-gastric feeding tubes, tracheostomy attachments, gastrostomy feeding tubes, jejunostomy feeding tubes, bandages, adjustable splints and casts.

15. An educational toy comprising:
   a doll in the form of an animal, said doll having a matt of fibers simulating fur;
   a replica of a medical treatment device;
   a first connector on said doll, said first connector being disposed among said fibers so as to be hidden from view, thereby providing said doll with a normal aspect; and
   a second connector on said replica, said second connector being removably coupled to said first connector to releasably attach said replica to said doll, thereby simulating application of a medical treatment to said doll.

16. A method for educating, comprising:
   providing a doll resembling a life form, said doll having a covering;
   further providing a replica of a medical treatment device;
   coupling a first connector on said replica to a second connector disposed beneath said covering so as to be hidden from view, the coupling of said first connector and said second connector taking place with said covering in place between said first connector and said second connector, thereby simulating application of a medical treatment to said doll; and
   subsequently removing said first connector from said second connector, whereby said doll resumes a normal appearance.

* * * * *